US006163254A

United States Patent [19]

Smith et al.

[11] Patent Number: 6,163,254

[45] Date of Patent: Dec. 19, 2000

[54] METHOD OF AVOIDING LOW CYCLE FATIGUE FAILURE OF TURBOCHARGERS

[75] Inventors: Ronald E. Smith, West Lafayette, Ind.; Gregg W. Uhland, Sycamore, Ill.

[73] Assignee: Caterpillar Inc., Peoria, Ill.

[21] Appl. No.: 09/447,614

[22] Filed: Nov. 23, 1999

[51] Int. Cl.$^7$ .......... B60Q 1/00

[52] U.S. Cl. .......... 340/439; 340/441; 60/608; 73/116; 123/479; 701/101

[58] Field of Search .......... 340/438, 439, 340/441; 60/602, 605.1, 608; 73/116, 117.2, 117.3, 117.4, 118.1; 123/478, 479, 486; 701/29, 54, 101, 102

[56] References Cited

U.S. PATENT DOCUMENTS

| | | | |
|---|---|---|---|
| 4,046,003 | 9/1977 | Armstrong et al. . | |
| 4,277,830 | 7/1981 | Reid et al. . | |
| 4,279,576 | 7/1981 | Okano et al. . | |
| 4,334,427 | 6/1982 | Armstrong . | |
| 4,483,146 | 11/1984 | Morikawa | 60/602 |
| 4,497,301 | 2/1985 | Inoue et al. | 123/486 |
| 4,603,552 | 8/1986 | Kido | 60/605.1 |
| 4,785,630 | 11/1988 | Dorsch | 60/602 |
| 4,901,530 | 2/1990 | Kawamura | 60/608 |
| 4,924,674 | 5/1990 | Hara et al. . | |
| 5,306,997 | 4/1994 | Akiyama | 318/721 |
| 5,557,552 | 9/1996 | Naito et al. . | |
| 5,569,848 | 10/1996 | Sharp . | |
| 5,581,464 | 12/1996 | Woll et al. . | |
| 5,744,707 | 4/1998 | Kull . | |

*Primary Examiner*—Edward Lefkowitz
*Attorney, Agent, or Firm*—Fred J. Baehr

[57] ABSTRACT

A method of avoiding low cycle fatigue failure of a turbocharger for an internal combustion engine having an electronic control module comprising the steps of: counting the number of cycles the speed of the engine and the fuel rate exceed a predetermined combination for a period of time and then drop below a lower predetermined combination for a period of time, determining an allowable number of said speed cycles that the turbocharger can experience without low cycle fatigue failure, comparing the counted number of speed cycles to the allowed number of speed cycles, providing an indication of the percentage of the counted speed cycles compared to the allowable number of speed cycles, and providing a signal that will alert an operator that the turbocharger is approaching low cycle fatigue failure.

17 Claims, 1 Drawing Sheet

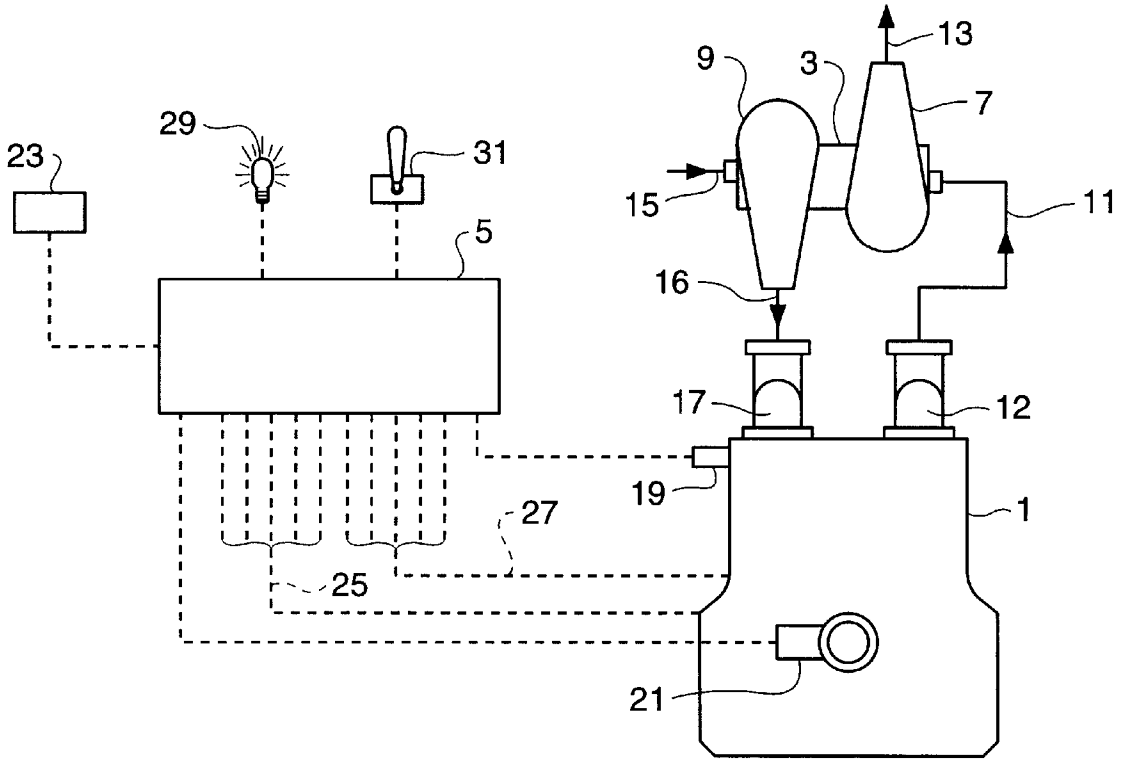
13
9
3
7
29
31
23
15
11
5
16
17
12
19
1
27
25
21

METHOD OF AVOIDING LOW CYCLE FATIGUE FAILURE OF TURBOCHARGERS

TECHNICAL FIELD

The invention relates to a turbocharger for an internal combustion engine and more particularly to a method of avoiding low cycle fatigue failure of turbochargers.

BACKGROUND ART

Turbocharger life on high performance internal combustion engines is commonly limited by fatigue of the compressor or turbine wheel. Turbocharger wheel life is a function of both the maximum turbocharger speed and low cycle fatigue resulting from repetitive cycling the speed of the turbocharger from a high speed to a low speed. U.S. Pat. No. 4,279,576 describes an electromagnetic device for determining the speed of a turbocharger.

DISCLOSURE OF THE INVENTION

In general, a method of avoiding low cycle fatigue failure of turbochargers for an internal combustion engine having an electronic control module made in accordance with this invention, comprises the steps of:

counting the number of cycles the speed of the turbocharger exceeds a high predetermined speed for a period of time and then drops below a lower predetermined speed for a period of time, determining an allowable number of said speed cycles that the turbocharger can experience without low cycle fatigue failure, comparing the counted number of speed cycles to the allowed number of speed cycles, providing an indication of the percent of counted speed cycles compared to the number of allowable speed cycles, and providing a signal that will alert an operator that the turbocharger is approaching low cycle fatigue failure.

BRIEF DESCRIPTION OF THE DRAWINGS

The invention as set forth in the claims will become more apparent by reading the following detailed description in conjunction with the accompanying drawings, wherein like reference numerals refer to like parts throughout the drawings and in which the Sole FIGURE is a schematic view of an internal combustion engine having a turbocharger and an electronic control module.

BEST MODE FOR CARRYING OUT THE INVENTION

Referring now to the Sole FIGURE in detail there is shown an internal combustion engine 1 comprising a turbocharger 3 and an electronic control module 5.

The turbocharger 3 has a turbine portion 7 with a turbine wheel (not shown) disposed therein, and a compressor portion 9 with a compressor wheel (not shown). An exhaust duct 11 connects the turbine portion 7 to an exhaust manifold 12 on the engine 1. And an exhaust pipe 13 discharges exhaust gasses from the turbine portion 7 into the atmosphere. An inlet air nozzle 15 brings inlet or combustion air into the compressor portion 9 and an inlet air duct 16 connects the compressor portion 9 to an inlet or combustion air manifold 17.

The electronic control module 5 is a computer capable of performing numerous mathematical operations and receiving signals from a group of sensors that provide input data to the electronic control module 5. The group of sensors comprises a fuel rate sensor 19, an engine speed sensor 21, an atmospheric pressure sensor 23 and other sensors 25 related to other engine operating conditions. There need not be a sensor for determining the speed of the turbocharger 3 directly. The electronic control module 5 utilizes a plurality maps or tables of empirical data points specific to the operation of a particular engine 1 and turbocharger 3 to compare the incoming signals to the maps disposed therein. The electronic control module 5 produces a plurality of control signals 27 to control to the operation of the engine 1. One of the maps or tables is an engine speed, fuel rate or rack position and torque map that controls the energy produced by or the power output of the engine 1. Utilizing a method for preventing low cycle fatigue failure of the turbocharger 3, described herein, the electronic control module can produce a visual signal 29 indicating the life remaining before turbocharger failure due to low cycle fatigue. It can also produce an audible signal 31 and, or a visual signal indicating that turbocharger failure due to low cycle fatigue is approaching.

A method of avoiding low cycle fatigue of a turbocharger 3 for an internal combustion engine 1 having an electronic control module comprises the steps of:

counting the number of cycles the speed of the turbocharger 3 exceeds a high predetermined speed generally about 60,00 rpm and then drops below a lower predetermined speed generally about 30,000;

Determining the allowable number of such speed cycles the turbocharger 3 can experience without low cycle fatigue failure, which may be as low as 1 million cycles;

Comparing the counted number of speed cycles to the allowed number of speed cycles;

Providing an indication of the percentage of counted speed cycles compared to the allowable number of cycles; and Alerting the operator that the turbocharger 3 is approaching low cycle fatigue failure by illuminating a warning signal 29 and or providing an audible signal 31.

The high predetermined turbocharger speed is slightly below the normal operating turbocharger speed and the lower predetermined speed is above the turbocharger speed when the engine 1 is idling.

The approximate speed of the turbocharger 3 may be determined by the operating condition of the engine 1 indicated on engine speed, fuel rate or rack position, torque map that controls the energy or work output of the engine 1. As engine speed and fuel rate or consumption increases the exhaust volume, pressure and temperature increase, increasing the energy supplied to the turbocharger and the speed of the turbocharger increases. Conversely, as the engine speed and fuel rate decrease the exhaust supplies less energy to the turbocharger 3 and it slows down. Thus a high engine speed and fuel rate corresponds to a high turbocharger speed and a lower engine speed and fuel rate corresponds to a lower turbocharger speed.

Altitude or atmospheric pressure also affects turbocharger speed, high altitude or lower atmospheric pressure causes the turbocharger 3 to speed up when the fuel rate and engine speed are generally the same.

Determining the allowable number of speed cycles the turbocharger 3 can experience with out failing due to low cycle fatigue comprises making a detailed stress analysis of the turbocharger 3 to determine the speed at which the turbocharger 3 will fly apart or fail due to over speeding and the stresses caused by speed cycles and the number of speed cycles that will result in low cycle fatigue failure. Empirical tests can also be run on the turbocharger 3 to verify maximum operating speed and the number of speed cycles that result in low cycle fatigue failure.

The allowable number of speed cycles decreases as the turbocharger operating speed approaches the maximum allowable turbocharger speed.

An altitude factor that reduces the number of allowable speed cycles is applied as the altitude at which the engine 1 operates increases as the operating speed of the turbocharger 3 increases as the altitude increases.

Providing an indication that the turbocharger 3 is approaching catastrophic failure allows replacement before failure, thus avoiding failure during operation reducing costly down time and expensive emergency repairs in the field.

While the preferred embodiments described herein set forth the best mode to practice this invention presently contemplated by the inventors, numerous modifications and adaptations of this invention will be apparent to others of ordinary skill in the art. Therefore, the embodiments are to be considered as illustrative and exemplary and it is understood that the claims are intended to cover such modifications and adaptations as they are considered to be within the spirit and scope of this invention.

What is claimed is:

1. A method of avoiding low cycle fatigue failure of a turbocharger for an internal combustion engine having an electronic control module comprising the steps of:

counting the number of cycles the speed of the turbocharger exceeds a high predetermined speed for a period of time and then drops below a lower predetermined speed for a period of time;

determining an allowable number of said speed cycles that the turbocharger can experience without low cycle fatigue failure;

comparing the counted number of speed cycles to the allowed number of speed cycles; and providing a signal that will alert an operator that the turbocharger is approaching low cycle fatigue failure.

2. The method as set forth in claim 1, further comprising the step of providing an indication of the percentage of counted speed cycles compared to said allowable number of speed cycles.

3. The method as set forth in claim 1, further comprising the step of determining said high and lower predetermined turbocharger speeds utilizing a torque, speed and fuel rate map and picking a high engine speed and fuel rate at which the engine must operate and then a lower engine speed and fuel rate at which the engine must operate to constitute one speed cycle.

4. The method as set forth in claim 3, wherein the step of determining the allowable number of speeds cycles, further comprises applying an altitude factor to reduce the number of allowable speed cycles as altitude at which the engine operates increases.

5. The method as set forth in claim 1, wherein the step of determining the allowable number of speed cycles that the turbocharger can experience with out low cycle fatigue failure comprises making a detailed stress analysis of the turbocharger to determine speed at which the turbocharger will fail due to over speeding, the stress caused by speed cycles and the number of speed cycles that result in low cycle fatigue failure.

6. The method as set forth in claim 1, further comprising the step of empirically testing the turbochargers for low cycle fatigue failure by counting the number of speed cycles required for the turbocharger to fail.

7. The method as set forth in claim 6, wherein the step of determining the allowable number of speed cycles further comprises applying an altitude factor that decreases the allowable number of speed cycles as the altitude at which the engine operates increases.

8. The method as set forth in claim 5, wherein the step of determining the allowable number of speed cycles further comprises applying an altitude factor that decreases the allowable number of speed cycles as the altitude at which the engine operates increases.

9. The method as set forth in claim 3, wherein the predetermined high engine speed and fuel rate is below a lowest normal engine operating speed and fuel rate and the predetermined lower engine speed and fuel rate is above an engine idle speed and fuel rate.

10. The method as set forth in claim 1, wherein the predetermined high engine speed and fuel rate is below a lowest normal engine operating speed and fuel rate and the predetermined lower engine speed and fuel rate is above an engine idle speed and fuel rate.

11. An electronic control module for an internal combustion engine having a turbocharger, wherein the control module counts the number of cycles the speed of the turbocharger exceeds a high predetermined speed for a period of time and then drops below a lower predetermined speed for a period of time; is provided with an allowable number of said speed cycles that the turbocharger can experience without low cycle fatigue failure; compares the counted number of speed cycles to the allowed number of speed cycles; and provides a signal that will alert an operator that the turbocharger is approaching low cycle fatigue failure.

12. The control module as set forth in claim 11, that provides an indication of the percentage of counted speed cycles compared to said allowable number of speed cycles.

13. The control module as set forth in claim 11, that utilizes a torque, speed and fuel rate map and a predetermined high engine speed and fuel rate at which the engine must operate and then a predetermined lower engine speed and fuel rate at which the engine must operate to constitute one speed cycle.

14. The control module as set forth in claim 13, that reduces the number of allowable speed cycles as altitude at which the engine operates increases.

15. The control module as set forth in claim 14, that provides an indication of the percentage of counted speed cycles compared to said allowable number of speed cycles.

16. The control module as set forth in claim 15, wherein the predetermined high engine speed and fuel rate is set below a lowest normal engine operating speed and fuel rate and the predetermined lower engine speed and fuel rate is set above an engine idle speed and fuel rate.

17. The control module as set forth in claim 11, wherein the predetermined high engine speed and fuel rate is set below a lowest normal engine operating speed and fuel rate and the predetermined lower engine speed and fuel rate is set above an engine idle speed and fuel rate.

* * * * *